(12) United States Patent
Taira

(10) Patent No.: US 6,591,631 B1
(45) Date of Patent: Jul. 15, 2003

(54) REFRIGERATING DEVICE

(75) Inventor: Shigeharu Taira, Kusatsu (JP)

(73) Assignee: Daiken Industries, Ltd., Osaka (JP)

(*) Notice: Subject to any disclaimer, the term of this patent is extended or adjusted under 35 U.S.C. 154(b) by 0 days.

(21) Appl. No.: 10/110,935

(22) PCT Filed: Oct. 12, 2000

(86) PCT No.: PCT/JP00/07068

§ 371 (c)(1), (2), (4) Date: Apr. 18, 2002

(87) PCT Pub. No.: WO01/29490

PCT Pub. Date: Apr. 26, 2001

(30) Foreign Application Priority Data

Oct. 18, 1999 (JP) .......................... 11-295243
Jul. 31, 2000 (JP) .......................... 2000-230932

(51) Int. Cl.$^7$ ............................ F25B 1/00; F25B 43/00
(52) U.S. Cl. ........................................ 62/498; 62/114
(58) Field of Search ..................... 62/114, 115, 467, 62/498, 502; 252/68

(56) References Cited

FOREIGN PATENT DOCUMENTS

| JP | 6-101940 A | 4/1994 |
|----|------------|--------|
| JP | 6-117736 A | 4/1994 |
| JP | 6-256757 A | 9/1994 |
| JP | 9-31450 A | 2/1997 |
| JP | 11-270918 A | 10/1999 |
| JP | 2000-257974 A | 9/2000 |

*Primary Examiner*—Denise L. Esquivel
*Assistant Examiner*—Malik N. Drake
(74) *Attorney, Agent, or Firm*—Birch, Stewart, Kolasch & Birch, LLP

(57) ABSTRACT

A refrigeration unit for performing a refrigerating cycle by circulating R32 as a refrigerant through a refrigerant circuit composed of a compressor (23), a condenser (22), expansion means (26), and an evaporator (2). An amount of R32 for filling the refrigerant circuit is set to be in a range of 120 g to 450 g per kW of refrigerating capacity, or an amount of R32 for filling the refrigerant circuit is set to be in a range of 400 g to 750 g per liter of unobstructed capacity of the condenser (22). By using R32 as a refrigerant that is small in Global Warming Potential (GWP), an energy-saving refrigeration against global warming with high coefficient of performance (COP) is obtained.

4 Claims, 6 Drawing Sheets

REFRIGERATING DEVICE

This application is the national phase under 35 U.S.C. §371 of PCT International Application No. PCT/JP00/07068 which has an International filing date of Oct. 12, 2000, which designated the United States of America.

TECHNICAL FIELD

The present invention relates to a refrigeration unit, and more particularly relates to a refrigeration unit with use of R32 (chemical formula: $CH_2F_2$) as a refrigerant alternative to R22 (chemical formula: $CHClF_2$) or with use of mixed refrigerants containing at least 70 weight percent R32.

BACKGROUND ART

Global environmental challenges relating to refrigeration units or air conditioners that perform a refrigerating cycle with use of refrigerants include (1) ozonosphere protection, (2) energy conservation, (3) measures against global warming (emission control of $CO_2$ ant the like), and (4) recycling of resources.

In the global environmental challenges, particularly in view of the ozonosphere protection, R22 (HFC22) is high in ODP (Ozone Depletion Potential) so that it is not regarded as a preferable refrigerant. Accordingly, as prospective refrigerants alternative to R22, there are R410A (HFC32:HFC125=50:50 (weight ratio)) and R407C (HFC32:HFC125:HFC134a=23:25:52 (weight ratio)). Some refrigeration units for performing a refrigerating cycle with use of R410A or R407C have achieved the same COP (Coefficient of Performance) as R22, and have already been manufactured as products.

As for energy conservation, there has already been notified that designated air conditioners are required to improve COP by approx. 4% by the end of September, 2004 (Notification No. 190 of the Ministry of International Trade and Industry based on "Law concerning the Rational Use of Energy"). Therefore, in view of energy conservation, it is necessary to use refrigerants having a large COP value.

In addition, demands for prevention of global warming is becoming harder. In the field of refrigeration units or air conditioners, an index to global warming called TEWI (Total Equivalent Warming Impact) is used to evaluate the refrigeration units and air conditioners. The TEWI is expressed as the sum of an impact of refrigerants released to the air (direct impact) and energy consumption of a unit (indirect impact). The direct impact includes GWP (Global Warming Potential), while the indirect impact includes a reciprocal of COP. Consequently, in order to prevent global warming, or equivalently, to decrease the value of TEWI, it is necessary to select refrigerants having a small GWP value and a large COP value.

The GWP values of R407C and R410A are 1980 and 2340, respectively, which are slightly larger than the GWP value 1900 of R22. Accordingly, R32 (HFC32) is expected as a prospective refrigerant having a small GWP value for prevention of global warming. R32 has the GWP value of 650, which is about one third of the GWP values 1900, 1980 and 2340 of R22, R407C and R410A, and therefore considered to be an extremely small value.

The COP values of R407C and R410A are approximately equal to the COP value of R22, whereas the COP value of R32 is not larger than that of R22. More particularly, although the refrigeration unit for performing a refrigerating cycle with use of R32 is theoretically expected a high COP value because of the characteristics of R32, any actual result that significantly exceeds the COP of R22 is not provided so far. Also, use of R32 brings about a phenomenon of higher pressure and higher discharge temperature compared to use of R22. In addition to that, there is a problem of difficulty in reaching a safety consensus because R32 has slight flammability. Because of this reason, the industrial society has not adopted R32 as an alternative refrigerant product.

DISCLOSURE OF INVENTION

Accordingly, it is an object of the present invention to provide an energy-saving refrigeration unit against global warming that is capable of achieving high COP (Coefficient of Performance) with use of R32 having a small GWP (Global Warming Potential) as a refrigerant.

The present invention is invented based on finding by an inventor of the present invention that a tendency for the COP of a refrigeration unit to change in response to an amount of a refrigerant (the total amount for filling a refrigerant circuit) is considerably different in types of refrigerants, especially between R32 and other refrigerants including R410A. More particularly, as shown in FIG. 1a, in the case of using, for example, R410A, there is a tendency that the COP gradually rises and saturates with increase of an amount of the refrigerant within the range shown in the drawing. On the contrary, in the case of using R32, there is a tendency that the COP marks a peak with change of an amount of the refrigerant, and then shows a sharp drop once an amount of the refrigerant is out of the range that gives the peak. Conventionally, the reason why use of R32 fails to provide high COP compared to use of R410A is because the refrigerants are used in the range that is relatively large in amount of the refrigerant (1200 g to 1300 g in the case shown in FIG. 1a). The notable point here is that a peak value of the COP in the case of using R32 with change in amount of the refrigerant is much higher than the COP in the case of using R410A with an optimum amount of the refrigerant (1300 g in the case of FIG. 1a). This indicates that use of R32 with an amount of the refrigerant set in an appropriate range enables achievement of high COP.

As described above, R32 has GWP much lower than that of conventional R22 and R410A (about one third). Further, adequate selection of an amount of the refrigerant enables R32 to obtain COP higher than that of R410A and R22. This makes TEWI (Total Equivalent Warming Impact) of R32 smaller than the TEWI of R22 and R410A, thereby proving superiority of R32 in global warming characteristics compared to R22 and R410A.

The present invention provides a refrigeration unit for performing a refrigerating cycle by circulating R32 as a refrigerant through a refrigerant circuit comprising a compressor, a condenser, expansion means, and an evaporator, wherein an amount of R32 for filling the refrigerant circuit is in a range of 120 g to 450 g per kW of refrigerating capacity.

As shown above, an amount of R32 for filling the refrigerant circuit being in the range of 120 g to 450 g per kW of refrigerating capacity implements high COP.

Herein, measuring method of refrigerating capacity (kW) shall conform to the regulations of Japan Industrial Standard (JIS) C9612.

It is noted that since an amount of R32 for filling is "in the range of 120 g to 450 g per kW of refrigerating capacity", the total amount of R32 for filling the refrigerant circuit is, for example, 600 g to 2250 g if the refrigerating capacity is 5 kW.

The present invention also provides a refrigeration unit for performing a refrigerating cycle by circulating R32 as a refrigerant through a refrigerant circuit comprising a compressor, a condenser, expansion means, and an evaporator, wherein an amount of R32 for filling the refrigerant circuit is in a range of 400 g to 750 g per liter of unobstructed capacity of the condenser.

As shown above, an amount of R32 for filling the refrigerant circuit being in the range of 400 g to 750 g per liter unobstructed capacity of the condenser implements high COP.

It is noted that the reason why an amount of R32 for filling the refrigerant circuit is prescribed as "per liter unobstructed capacity of the condenser" is because the unobstructed capacity of the condenser is dominant over an amount of the filling refrigerant.

Also, since an amount of R32 for filling is "in a range of 400 g to 750 g per liter of unobstructed capacity of the condenser", the total amount of R32 for filling the refrigerant circuit is, for example, in the range of 600 g to 1125 g if the unobstructed capacity of the condenser is 1.5 liter.

The principles of the invention are not only applicable to a single refrigerant of R32, but also applicable to mixed refrigerants containing at least 70 weight percent R32.

The present invention also provides a refrigeration unit for performing a refrigerating cycle by circulating mixed refrigerants containing at least 70 weight percent R32 through a refrigerant circuit comprising a compressor, a condenser, expansion means, and an evaporator, wherein an amount of the R32 for filling the refrigerant circuit is in a range of 84 g to 450 g per kW of refrigerating capacity.

In the case of using mixed refrigerants containing at least 70 weight percent R32 as shown above, an amount of R32 for filling the refrigerant circuit being in the range of 84 g to 450 g per kW of refrigerating capacity implements high COP.

The present invention also provides a refrigeration unit for performing a refrigerating cycle by circulating mixed refrigerants containing at least 70 weight percent R32 through a refrigerant circuit comprising a compressor, a condenser, expansion means, and an evaporator, wherein an amount of the R32 for filling the refrigerant circuit is in a range of 280 g to 750 g per liter of unobstructed capacity of the condenser.

In the case of using mixed refrigerants containing at least 70 weight percent R32 as shown above, an amount of R32 for filling the refrigerant circuit being in the range of 280 g to 750 g per liter of unobstructed capacity of the condenser implements high COP.

BRIEF DESCRIPTION OF DRAWINGS

FIG. 1A shows the result in cooling operation and FIG. 1B shows the result in heating operation;

FIG. 3A is a view showing comparison of COP of R32 and R410A in percentage, and FIG. 3B is a view showing the comparison in measured values;

BEST MODE FOR CARRYING OUT THE INVENTION

Detailed description will now be given of a refrigeration unit in embodiments of the present invention with reference to drawings.

Figure 2:
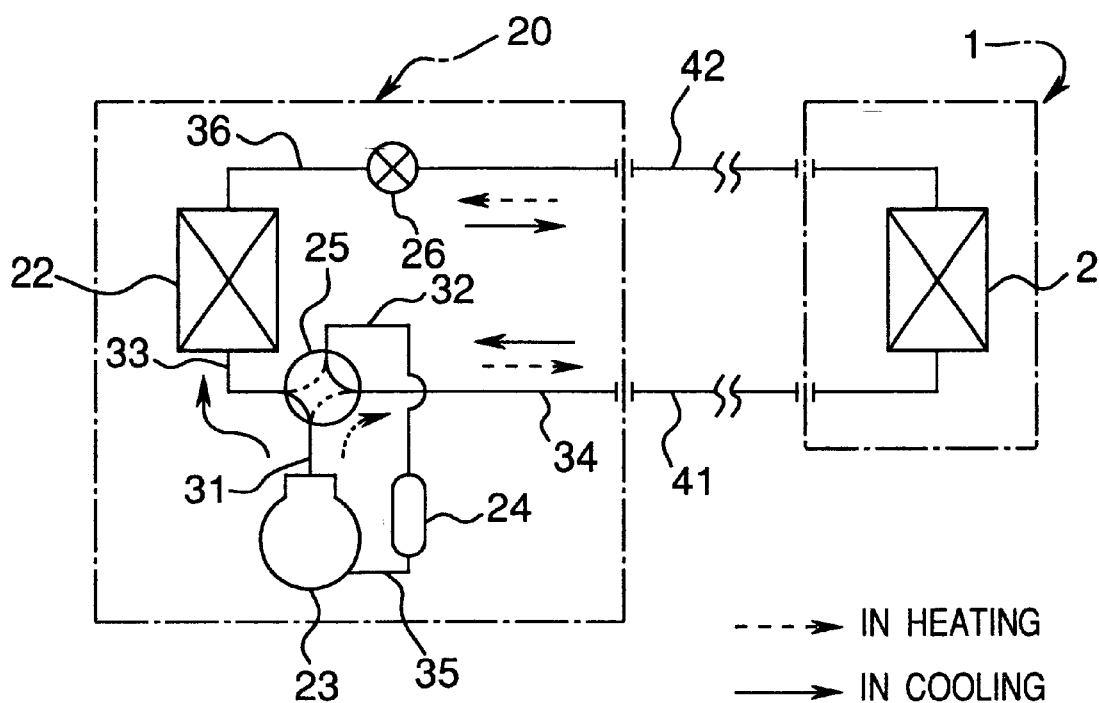
FIG. 2 is a view showing outline structure of a heat pump type air conditioner in one embodiment of the present invention.

FIG. 2 shows outline structure of a heat pump type air conditioner in one embodiment of the present invention. In the air conditioner, an outdoor unit 20 and an indoor unit 1 are connected by refrigerant pipes 41 and 42 to constitute a refrigerant circuit, through which R32 is circulated as a refrigerant. The indoor unit 1 accommodates an indoor heat exchanger 2. The outdoor unit 20 accommodates a compressor 23 for compressing and discharging a refrigerant (R32), a four-pass diverter valve 25 for diverting refrigerant passes, an outdoor heat exchanger 22, a motor-driven expansion valve 26, and an accumulator 24 for vapor-liquid separation of the circulated refrigerant.

In cooling operation for performing the refrigerating cycle, by switching setting of the four-pass diverter valve 25, a refrigerant discharged by the compressor 23 is sent, as shown with a solid line in FIG. 2, through a pipe 31, the four-pass diverter valve 25 and a pipe 33, to the outdoor heat exchanger 22 functioning as a condenser. The refrigerant condensed in the outdoor heat exchanger 22 is sent through a pipe 36, an expansion valve 26 for tightening the pass to expand the refrigerant and a pipe 42, to the indoor heat exchanger 2 functioning as an evaporator. Further, the refrigerant evaporated in the indoor heat exchanger 2 is returned through a pipe 41, a pipe 34, the four-pass diverter valve 25, a pipe 32, an accumulator 24 and a pipe 35, to the compressor 23. In heating operation, the four-pass diverter valve 25 is switched to send a refrigerant discharged by the compressor 23 to the indoor heat exchanger 2 functioning as a condenser through the pipe 31, the four-pass diverter valve 25, the pipe 34 and the pipe 41, as shown with a dotted line in FIG. 2. The refrigerant condensed in the indoor heat exchanger 2 is sent to the pipe 42, the expansion valve 26 in a full-open state, the pipe 36, and the outdoor heat exchanger 22 functioning as an evaporator. Further, the refrigerant evaporated in the outdoor heat exchanger 22 is returned through the pipe 33, the four-pass diverter valve 25, the pipe 32, the accumulator 24 and the pipe 35, to the compressor 23.

Figure 4A:
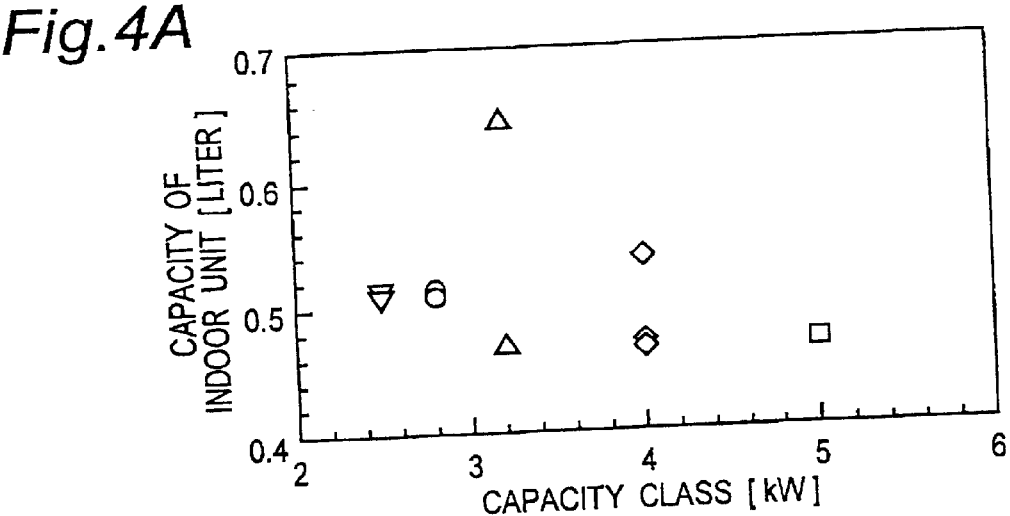
FIGS. 4A, 4B and 4C are views each showing setting values of unobstructed capacity of an indoor heat exchanger and unobstructed capacity of an outdoor heat exchanger of the air conditioner.
Figure 4B:
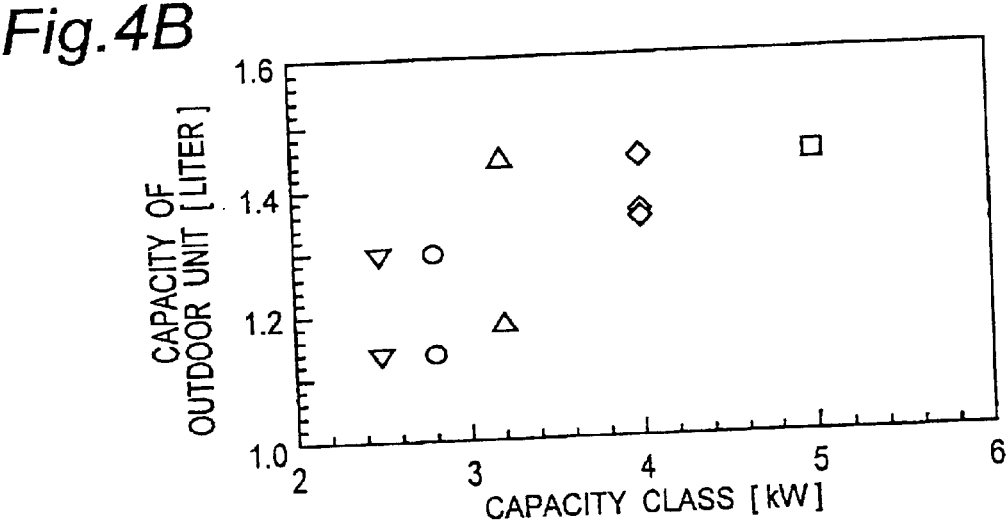
Figure 4C:
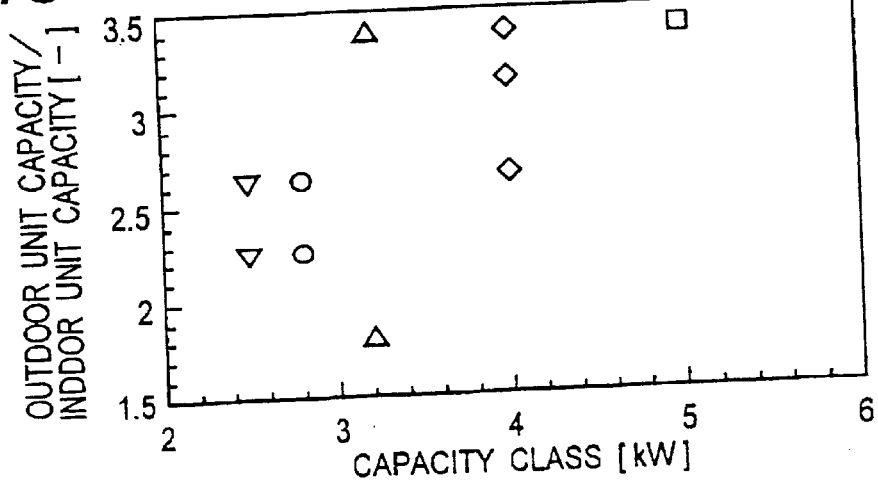

For evaluating COP (Coefficient of Performance) of the air conditioner, the inventor of the present invention prepared air conditioners different in capacity class from 2.2 kW to 5.0 kW with unobstructed capacity of the indoor heat exchanger 2 and unobstructed capacity of the outdoor heat exchanger 22 changed in variations as shown in FIGS. 4A and 4B. FIG. 4C shows comparison of the unobstructed capacity of the outdoor heat exchanger 22 and the unobstructed capacity of the indoor heat exchanger 2. Unobstructed capacity of the entire refrigerant circuit is changed according to setting of the unobstructed capacity of the indoor heat exchanger 2 and the unobstructed capacity of the outdoor heat exchanger 22.

Figure 1A:
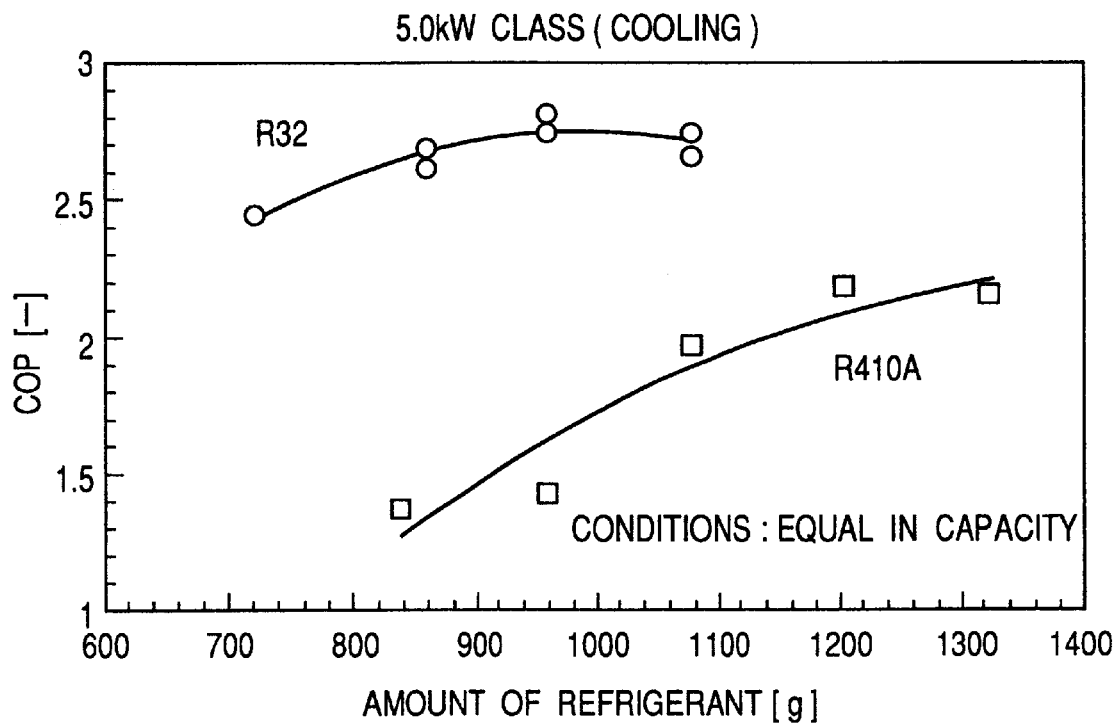
FIGS. 1A and 1B are views showing the results of measuring COP in the case of using R32 as a refrigerant and COP in the case of using R410A as a refrigerant, each with an amount of the refrigerant (the total amount for filling the refrigerant circuit) changed in cooling operation, where
Figure 1B:
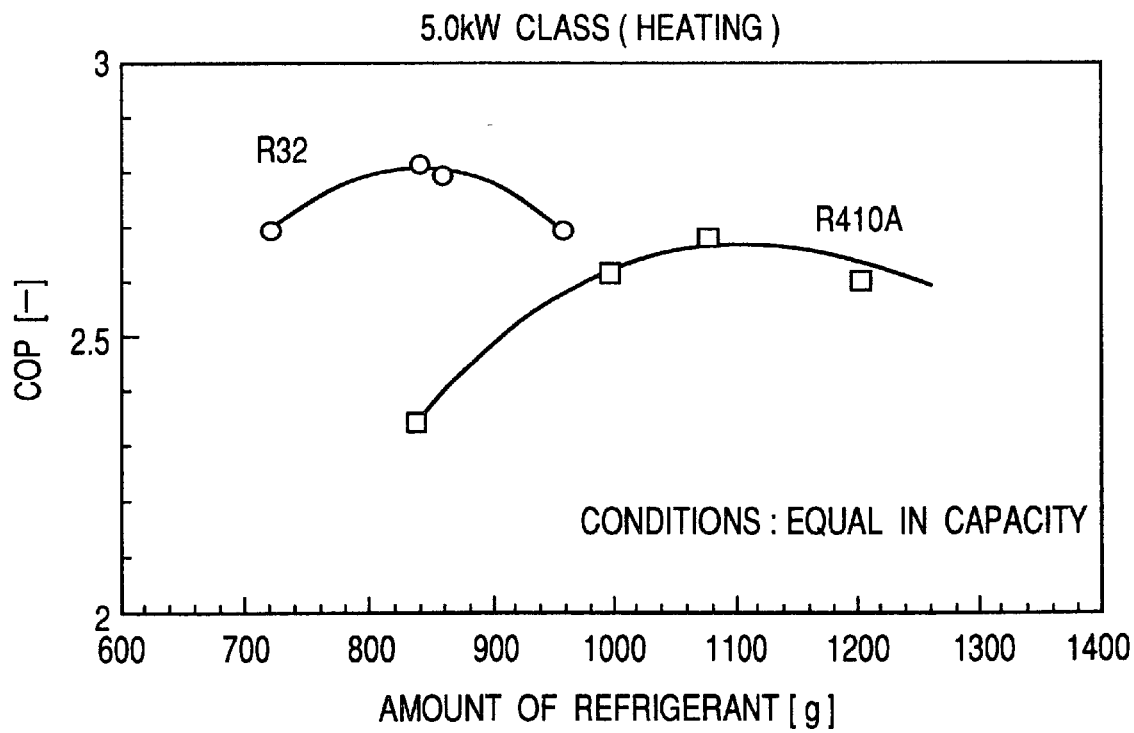

For example, for the 5.0 kW class air conditioner, unobstructed capacity of the outdoor heat exchanger 22 is set to 1.45 liter and unobstructed capacity of the indoor heat exchanger 2 is set to 0.47 liter. In the 5.0 kW class air conditioner, COP was measured with an amount of a refrigerant (the total amount for filling the refrigerant circuit) changed. The result thereof is shown in FIGS. 1A and 1B, where FIG. 1A shows COP in cooling operation and FIG. 1B shows COP in heating operation. As shown in FIG. 1A, in cooling operation, relatively high peak COP values of 2.7 to 2.8 were obtained when an amount of the refrigerant was 960 g, whereas the air conditioner with the same capacity of 5.0 kW and use of R410A showed COP of 2.2 at most (when an amount of the refrigerant was 1300 g).

Thus, it was attempted to find the range of an amount of the refrigerant that gives a COP peak under each condition in the case of using R32. As a result, it was found that the COP peak is given when an amount of R32 for filling the refrigerant circuit is in the range of 120 g to 450 g per kW of refrigerating capacity, or an amount of R32 for filling the refrigerant circuit is in the range of 400 g to 750 g per liter of unobstructed capacity of the outdoor heat exchanger 22.

Figure 3A:
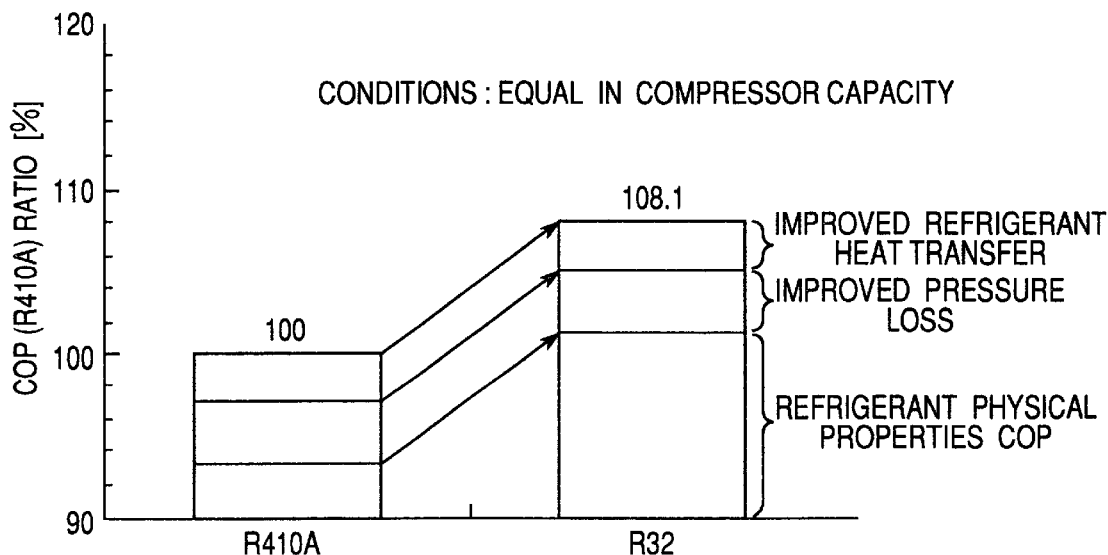
FIGS. 3A and 3B are views showing comparison of COP in the case of using R32 and COP in the case of using R410A under conditions of equal capacity (equal in compressor capacity), where
Figure 3B:
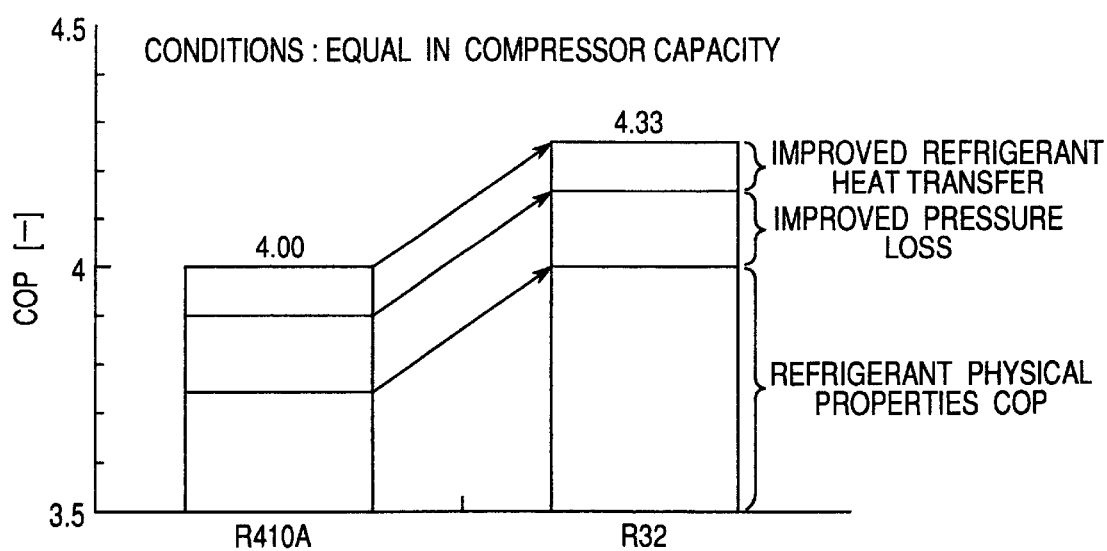

Also, in the case of the same capacity (equal in compressor capacity) in the range from 2.2 kW to 5.0 kW, COP with use of R32 and COP with use of R410A were compared, and the result as shown in FIGS. 3A and 3B were obtained. An amount of the refrigerant in the case of using R32 was optimized in the range of 60 wt. % to 80 wt. % against an amount of the refrigerant in the case of using R410A. FIG. 3A shows that the COP with use of R32 was 108.1% when using the COP value with use of R410A as a reference (100%). FIG. 3B shows that the COP with use of R410A was 4.00 whereas the COP with use of R32 was 4.33. This implies that use of R32 with an amount of the refrigerant set in an appropriate range enables achievement of the COP much higher than that in the case of using R410A. The improvement of the COP may be attributed to small pressure loss and improved heat transfer of the refrigerant in addition to improved physical properties of the refrigerant.

FIGS. 1A and 1B also indicate that an optimum amount of the refrigerant that gives a COP peak in the case of using R32 was 960 g in cooling operation and 840 g in heating operation, whereas an optimum amount of the refrigerant in the case of using R410A was 1300 g in cooling operation and 1100 g in heating operation. As this result implies, a cooling/heating ratio of an optimum amount of the refrigerant in the case of using R32 is closer to 1 compared to the case of using R410A. This saves a cooling/heating refrigerant adjusting container and implements decrease of accumulator capacity.

Although in the embodiment, description was made of the heat pump type air conditioner, the present invention is naturally not limited thereto. The present invention is broadly applicable to the units for performing a refrigerating cycle with use of R32 as a refrigerant.

Also the principles of the present invention are not only applicable to a single refrigerant of R32, but also applicable to mixed refrigerants containing at least 70 weight percent R32. For example, a compound of R32 and R125 is regarded as a mixed refrigerant. In the mixed refrigerants of R32 and R125, the range having 70 weight percent R32 or less is an azeotropic range where the liquid composition and the generated vapor composition are identical, while other ranges are categorized as a nonazeotropic range. With increase of a content of R32, properties of R32 are clarified, and in the nonazeotropic range, the properties of R32 become remarkable.

Experiments performed by the present inventor confirmed that in the case of using mixed refrigerants containing at least 70 weight percent R32, high COP is obtained if an amount of R32 for filling the refrigerant circuit is in the range of 84 g to 450 g per kW of refrigerating capacity, or an amount of R32 for filling the refrigerant circuit is in the range of 280 g to 750 g per liter of unobstructed capacity of the condenser.

Figure 5:
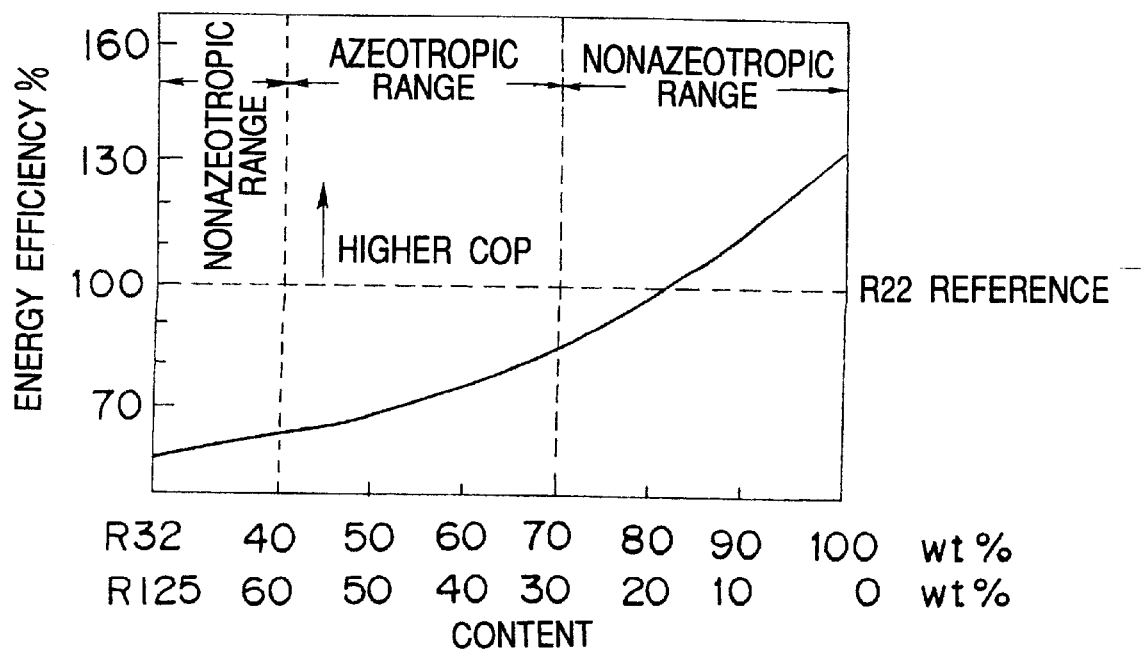
FIG. 5 is a view showing a content and energy efficiency of R32 in mixed refrigerants of R32 and R125.

FIG. 5 shows relationship between a content of R32 in mixed refrigerants containing R125 and energy efficiency. With a content of R32 equal to 70 weight percent or more, rise of the energy efficiency is remarkable. With a content of R32 beyond approx. 80 weight percent, the energy efficiency exceeds the energy efficiency of R22. Therefore, with a content of R32 equal to 70 weight percent or more, high COP is obtained.

Thus, a single refrigerant of R32 or mixed refrigerants containing at least 70 weight percent R32 are, as shown in FIGS. 1 and 5, have the COP equal to or higher than that of conventional refrigerants such as R22. Further, the GWP (Global Warming Potential) of R32 is as low as approx. one third of the GWP of conventional refrigerants such as R22 as stated before. Consequently, the TEWI (Total Equivalent Warming Impact) of R32 is lower than the TEWI of R22 and R410A (lowering rate of 10 to 20%), thereby proving superiority of R32 in global warming characteristics compared to R22 and R410A.

In view of the forgings, R32 refrigerant and mixed refrigerants containing at least 70 weight percent R32 are not only free from depleting ozonosphere but also small in GWP (Global Warming Potential) and TEWI (Total Equivalent Warming Impact) and large in COP (Coefficient of Performance), which makes them energy-saving refrigerants against global warming.

Figure 6:
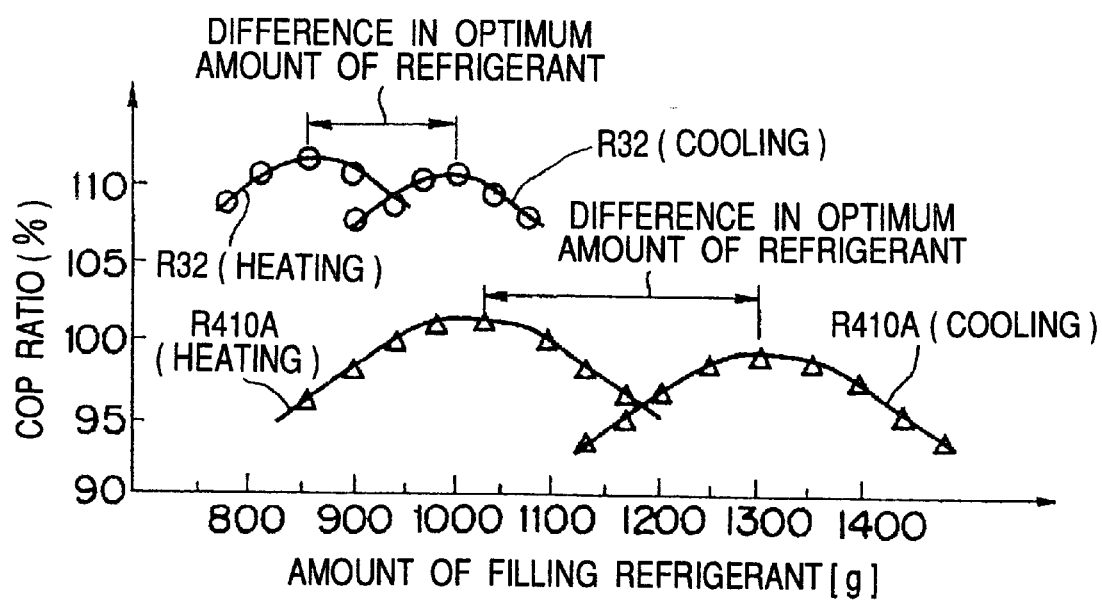
FIG. 6 is a view showing COP against an amount of refrigerants R32 and R410A in cooling and heating.

Also, a refrigeration unit with use of R32 refrigerant is, as shown in FIG. 6, capable of obtaining high COP with an amount of the filling refrigerant smaller than that of R410 refrigerant, and small in difference between an optimum amount of the refrigerant in cooling and an optimum amount of the refrigerant in heating. More particularly, R32 refrigerant is high in heat transfer capacity compared to R410A refrigerant, capable of implementing sufficient capacity with a small amount of the filling refrigerant, and small in difference between an optimum amount of the refrigerant in cooling and an optimum amount of the refrigerant in heating compared to R410 refrigerant, which enables reduction of an amount of the refrigerant for use in the refrigeration unit.

Figure 7:
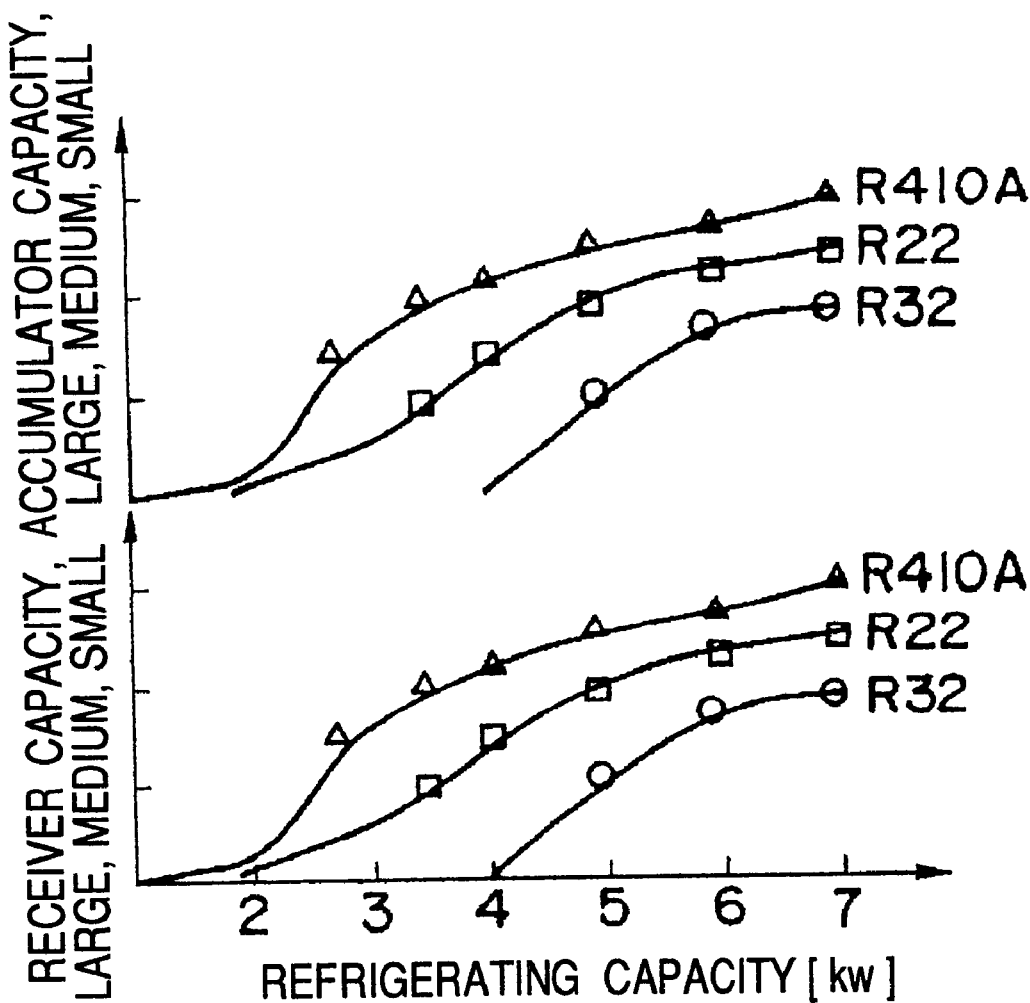
FIG. 7 is a view showing capacity of an accumulator and a receiver against the refrigerating capacity of each of refrigerants R32, R410A and R22.

FIG. 7 shows capacity of an accumulator and a receiver against the refrigerating capacity of each of the refrigerants R32, R410A and R22. As shown in FIG. 7, the refrigeration unit with refrigerating capacity of 4 kW or less needs neither an accumulator nor a receiver. Therefore, the refrigeration unit with use of R32 saves an accumulator and a receiver, which enables reduction of production costs of the refrigeration unit as well as downsizing of the refrigeration unit.

What is claimed is:

1. A refrigeration unit for performing a refrigerating cycle by circulating R32 as a refrigerant through a refrigerant circuit comprising a compressor (23), a condenser (22), expansion means (26), and an evaporator (2), wherein an amount of R32 for filling the refrigerant circuit is in a range of 120 g to 450 g per kW of refrigerating capacity.

2. A refrigeration unit for performing a refrigerating cycle by circulating R32 as a refrigerant through a refrigerant circuit comprising a compressor (23), a condenser (22), expansion means (26), and an evaporator (2), wherein an amount of R32 for filling the refrigerant circuit is in a range of 400 g to 750 g per liter of unobstructed capacity of the condenser.

3. A refrigeration unit for performing a refrigerating cycle by circulating mixed refrigerants containing at least 70 weight percent R32 through a refrigerant circuit comprising a compressor (23), a condenser (22), expansion means (26), and an evaporator (2), wherein an amount of the R32 for filling the refrigerant circuit is in a range of 84 g to 450 g per kW of refrigerating capacity.

4. A refrigeration unit for performing a refrigerating cycle by circulating mixed refrigerants containing at least 70 weight percent R32 through a refrigerant circuit comprising a compressor (23), a condenser (22), expansion means (26), and an evaporator (2), wherein an amount of the R32 for filling the refrigerant circuit is in a range of 280 g to 750 g per liter of unobstructed capacity of the condenser.

* * * * *